US010987734B2

(12) United States Patent
Ichijo

(10) Patent No.: US 10,987,734 B2
(45) Date of Patent: Apr. 27, 2021

(54) LAMINATION MOLDING METHOD

(71) Applicant: SODICK CO., LTD., Kanagawa (JP)

(72) Inventor: Tsukasa Ichijo, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 54 days.

(21) Appl. No.: 16/882,541

(22) Filed: May 24, 2020

(65) Prior Publication Data

US 2020/0282460 A1 Sep. 10, 2020

Related U.S. Application Data

(63) Continuation of application No. 15/666,581, filed on Aug. 2, 2017.

(30) Foreign Application Priority Data

Sep. 1, 2016 (JP) .............................. JP2016-171051

(51) Int. Cl.
*B29C 67/00* (2017.01)
*B22F 3/105* (2006.01)
(Continued)

(52) U.S. Cl.
CPC ............ *B22F 3/1055* (2013.01); *B22F 3/162* (2013.01); *B23K 26/0876* (2013.01); *B23K 26/342* (2015.10); *B23K 26/702* (2015.10); *B29C 64/393* (2017.08); *B33Y 30/00* (2014.12); *B33Y 50/02* (2014.12); *B22F 2003/1056* (2013.01); *B22F 2003/1057* (2013.01); *B22F 2999/00* (2013.01); *B29C 64/153* (2017.08); *Y02P 10/25* (2015.11)

(58) Field of Classification Search
CPC ........ B22F 3/105; B22F 3/1055; B22F 3/162; B22F 2003/1057; B22F 2003/247; B22F 2998/10; B33Y 10/00; B33Y 30/00; B33Y 50/02; B29C 64/10; B29C 64/386
See application file for complete search history.

(56) References Cited

U.S. PATENT DOCUMENTS

2007/0252309 A1* 11/2007 Higashi ................... B22F 3/105
264/408
2015/0283611 A1* 10/2015 Takezawa ........... B28B 17/0081
425/78
(Continued)

*Primary Examiner* — Thu Khanh T Nguyen
(74) *Attorney, Agent, or Firm* — JCIPRNET

(57) ABSTRACT

A lamination molding apparatus includes a chamber, covering at least a molding area which is the maximum range in which a three-dimensional object can be produced; a molding table, disposed in the molding area in the chamber, on which material powder layers are formed by uniformly spread material powder for each of divided layers, wherein the divided layers are obtained by dividing a desired three-dimensional object for each of a specific thickness; a powder holding wall, surrounding the molding table and holding the material powder supplied onto the molding table; a laser irradiation device, forming sintered layers by irradiating laser beam on specific irradiation areas defined by the contour shape of the desired three-dimensional object of the divided layers on the material powder layers; and a numerical control device, determining, at least before sintering, whether the irradiation areas of all the divided layers are included in the molding area.

3 Claims, 8 Drawing Sheets

(51) Int. Cl.
*B22F 3/16* (2006.01)
*B29C 64/393* (2017.01)
*B33Y 30/00* (2015.01)
*B33Y 50/02* (2015.01)
*B23K 26/342* (2014.01)
*B23K 26/70* (2014.01)
*B23K 26/08* (2014.01)
*B29C 64/153* (2017.01)

(56) References Cited

U.S. PATENT DOCUMENTS

2015/0283761 A1* 10/2015 Maeda ................ B29C 64/393
 264/408
2016/0129631 A1* 5/2016 Chen .................... B29C 64/245
 425/150

* cited by examiner

LAMINATION MOLDING METHOD

CROSS REFERENCE TO RELATED APPLICATIONS

This is a continuation application of patent application Ser. No. 15/666,581, filed on Aug. 2, 2017, now pending, which claims the priority benefit of Japanese Patent Application No. 2016-171051, filed on Sep. 1, 2016. The entirety of each of the above-mentioned patent application is hereby incorporated by reference herein and made a part of this specification.

BACKGROUND OF THE INVENTION

1. Field of the Invention

The present invention relates to a lamination molding apparatus.

2. Description of Related Art

In the selective laser sintering method using laser beam, material powder is uniformly spread on a molding table to form a material powder layer. Next, the laser beam is irradiated on a specific portion of the material powder layer to form a sintered layer. Furthermore, material powder is then uniformly spread on the sintered layer to form a new material powder layer. Then, the laser beam is irradiated on the new material powder layer to sinter the material powder so as to form a new sintered layer that is bonded with the lower sintered layer. By repeating these steps, a desired three-dimensional object that is united as a sintered body formed by laminating a plurality of sintered layers is obtained.

The laser beam is scanned by an optical deflector, for example, a galvano scanner. Due to the displacement of the optical deflector or the apparatus, an unavoidable deviation occurs between a specific scanning path on the laser control device and a scanning track actually formed on the material powder layer. Therefore, to enable the laser beam to be irradiated along a specific scanning path, the deviation amount must be measured and corrected. For example, as disclosed in Patent Document 1 (Japanese Patent No. 2979431) and Patent Document 2 (Japanese Patent No. 3446741), a lamination molding apparatus that is well known uses a method as follows to measure the deviation amount and correct the deviation. Specifically, a calibration plate such as a plate or thermal paper that is disposed on a molding area is scanned in a grating frame shape at regular intervals with the laser beam, specific positions such as intersections of the scanning track are measured, and the actual irradiated positions of the laser beam toward the specific positions are compared with reference positions.

In addition, for safety purpose, in a lamination molding apparatus using laser beam has limits with regard to the irradiation position of the laser beam. The limits are a mechanical limit which is a physical limit and a software limit which is a control limit, so that an irradiation-enabled area, which is an area that allows irradiation of the laser beam, can be set by the limits. In another aspect, as in the inventions of Patent Document 1 and Patent Document 2, when the deviation amount is measured and the scanning path or a plurality of irradiation positions is corrected with reference to a molding area, that is, the largest area in which a three-dimensional object can be produced, a correction area which includes the scanning track of the laser beam in the grating frame shape or a plurality of irradiation marks formed before the correction may partially exceed the molding area. Therefore, in order to correctly perform the correction, it is necessary to set the irradiation-enabled area to include the molding area and to be larger than the molding area on control.

SUMMARY OF THE INVENTION

In a lamination molding apparatus in which the irradiation-enabled area is set to include a molding area and to be larger than the molding area, in case of a mistake in molding data which contains a command for irradiating an area outside the molding area, laser beam is irradiated outside the molding area so that the object cannot be produced normally, and the apparatus may be damaged. Even if the irradiation-enabled area is set to be as large as the molding area, when the original molding data has errors, the molding cannot be continued, so the material powder consumed so far is wasted, and time is wasted.

In view of this, the present invention is accomplished to provide a lamination molding apparatus, which can properly form a three-dimensional object in a molding area by determining before molding whether an irradiation area of laser beam of all divided layers is included in the molding area.

According to the present invention, a lamination molding apparatus is provided, including a chamber, covering at least a molding area which is the maximum range in which a three-dimensional object can be produced; a molding table, disposed in the molding area in the chamber, on which material powder layers are formed by uniformly spread material powder for each of a plurality of divided layers, wherein the divided layers are obtained by dividing a desired three-dimensional object for each of a specific thickness; a powder holding wall, surrounding the molding table and holding the material powder supplied onto the molding table; a laser irradiation device, forming sintered layers by irradiating laser beam on specific irradiation areas defined by the contour shape of the desired three-dimensional object of the divided layers on the material powder layers; and a numerical control device, determining, at least before sintering, whether the irradiation areas of all the divided layers are included in the molding area.

In the lamination molding apparatus of the present invention, the molding starts after whether the irradiation areas of the laser beam is included in the molding area in all the divided layers is determined. Therefore, the three-dimensional object can be properly formed within the molding area, so that the molding interruption can be prevented. In addition, the damage to the apparatus caused by the laser beam irradiated on improper positions can be prevented.

DESCRIPTION OF THE EMBODIMENTS

Embodiments of the present invention will be described with reference to the drawings in the following. Modifications to a plurality of constituent members described in the following can be freely combined and implemented.

Figure 1:
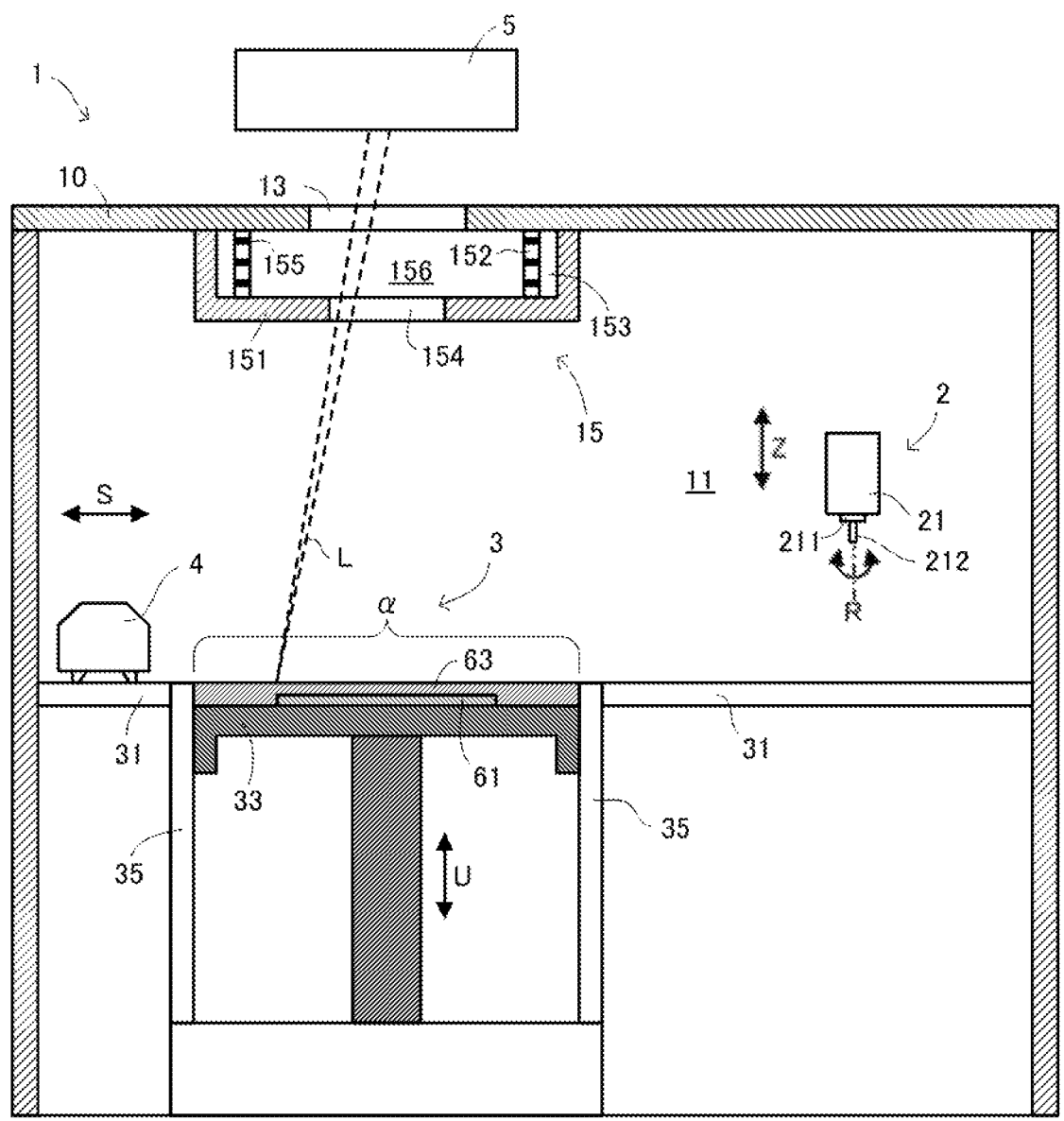
FIG. 1 is a structural diagram of a lamination molding apparatus 1 according to an embodiment of the present invention.

As shown in FIG. 1, a lamination molding apparatus 1 according to an embodiment of the present invention includes a substantially sealed chamber 10. The chamber 10 is separated into a molding compartment 11 and a drive compartment by bellows. A powder layer forming device 3 is disposed in the molding compartment 11 in which the lamination molding is performed. The drive compartment accommodates most part of a processing head drive device 23. In FIG. 1, only the molding compartment 11 is shown. An inactive gas supply device (not shown) supplies an inactive gas to the molding compartment 11 and the drive compartment in a manner that the chamber 10 is constantly filled with the inactive gas above a specific concentration, and discharges the inactive gas contaminated by fume generated due to the irradiation of laser beam L out of the chamber 10. In addition, in this specification, the inactive gas is a gas that does not substantially react with the material powder, for example, nitrogen gas, argon gas, and helium gas, which may be selected according to the type of the material powder.

The powder layer forming device 3 includes a base table 31 having a molding area α, and includes a recoater head 4 disposed on the base table 31 and configured to be movable along a horizontal uniaxial direction (a direction indicated by arrows S). A molding table 33 movable along a vertical direction (a direction indicated by arrows U) is disposed in the molding area α. When the lamination molding apparatus 1 is used, a molding plate 61 is arranged on the molding table 33, and a material powder layer 63 is formed on the molding plate 61. A powder holding wall 35 surrounds the molding table 33. Material powder that has not been sintered is held in a powder holding space surrounded by the powder holding wall 35 and the molding table 33.

The molding area α is the whole of a working area where the molding is performed, that is, the largest area in which the material powder layer 63 can be formed to form the sintered layer and in which the three-dimensional object can be produced, and is substantially equivalent to the entire upper surface of the molding table 33.

Figure 2:
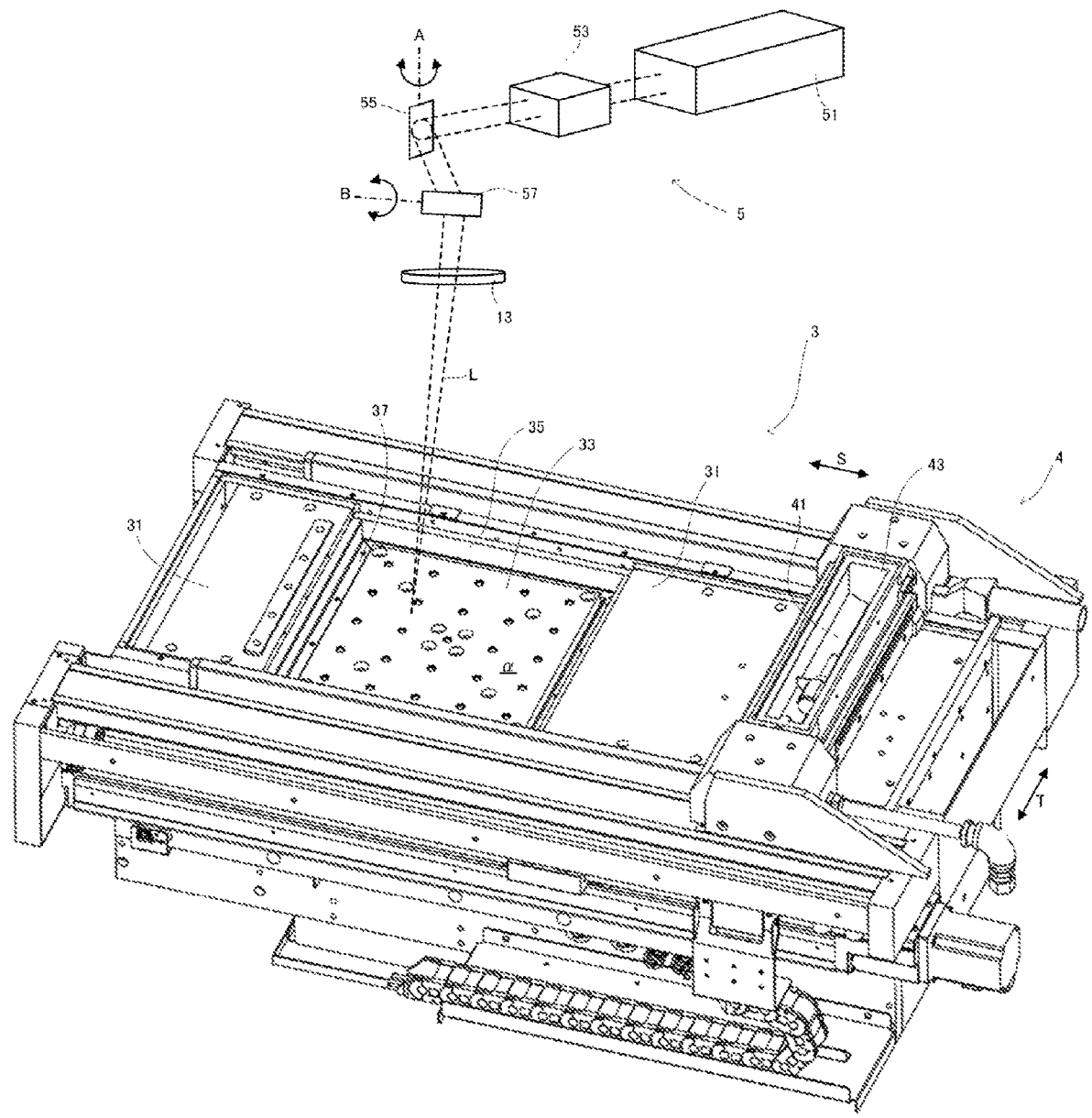
FIG. 2 is a perspective view of a powder layer forming device 3 and a laser irradiation device 5.

As shown in FIG. 2, the molding table 33 does not directly contact the powder holding wall 35. Instead, the upper wiper 37 disposed on the periphery of the molding table 33 contacts the powder holding wall 35. Moreover, when the molding table 33 moves, the upper wiper 37 slides on the powder holding wall 35. This structure inhibits leakage of the material powder in the powder holding space.

Figure 3:
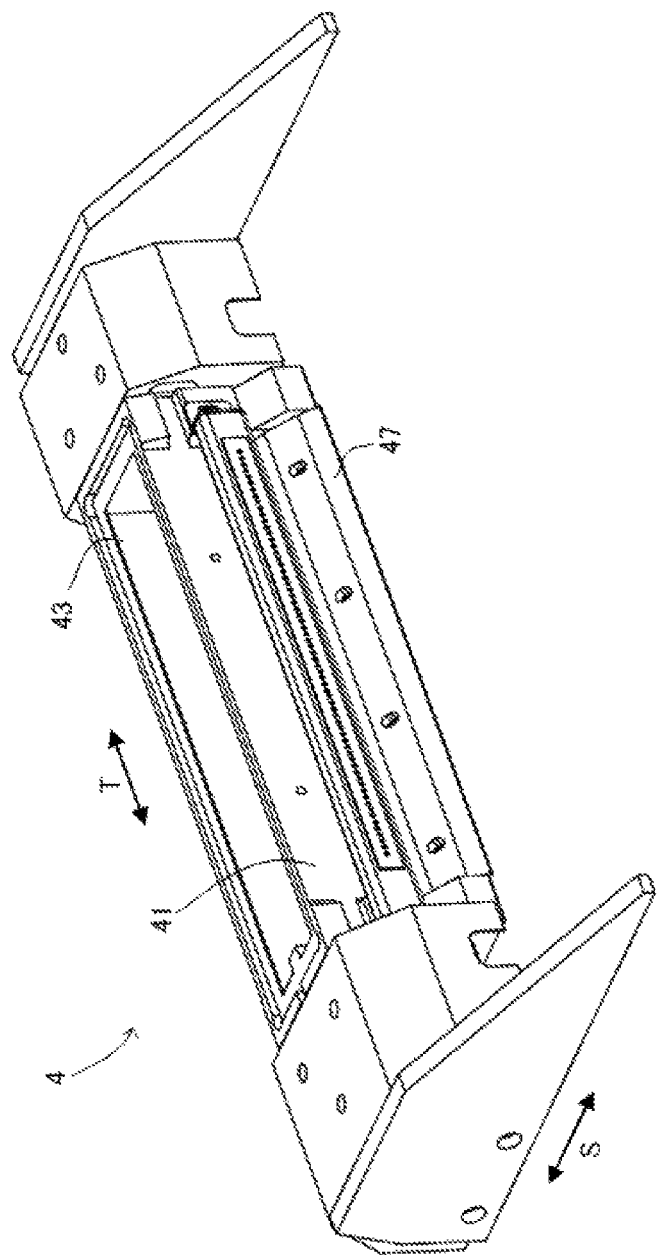
FIG. 3 is a perspective view of a recoater head 4.
Figure 4:
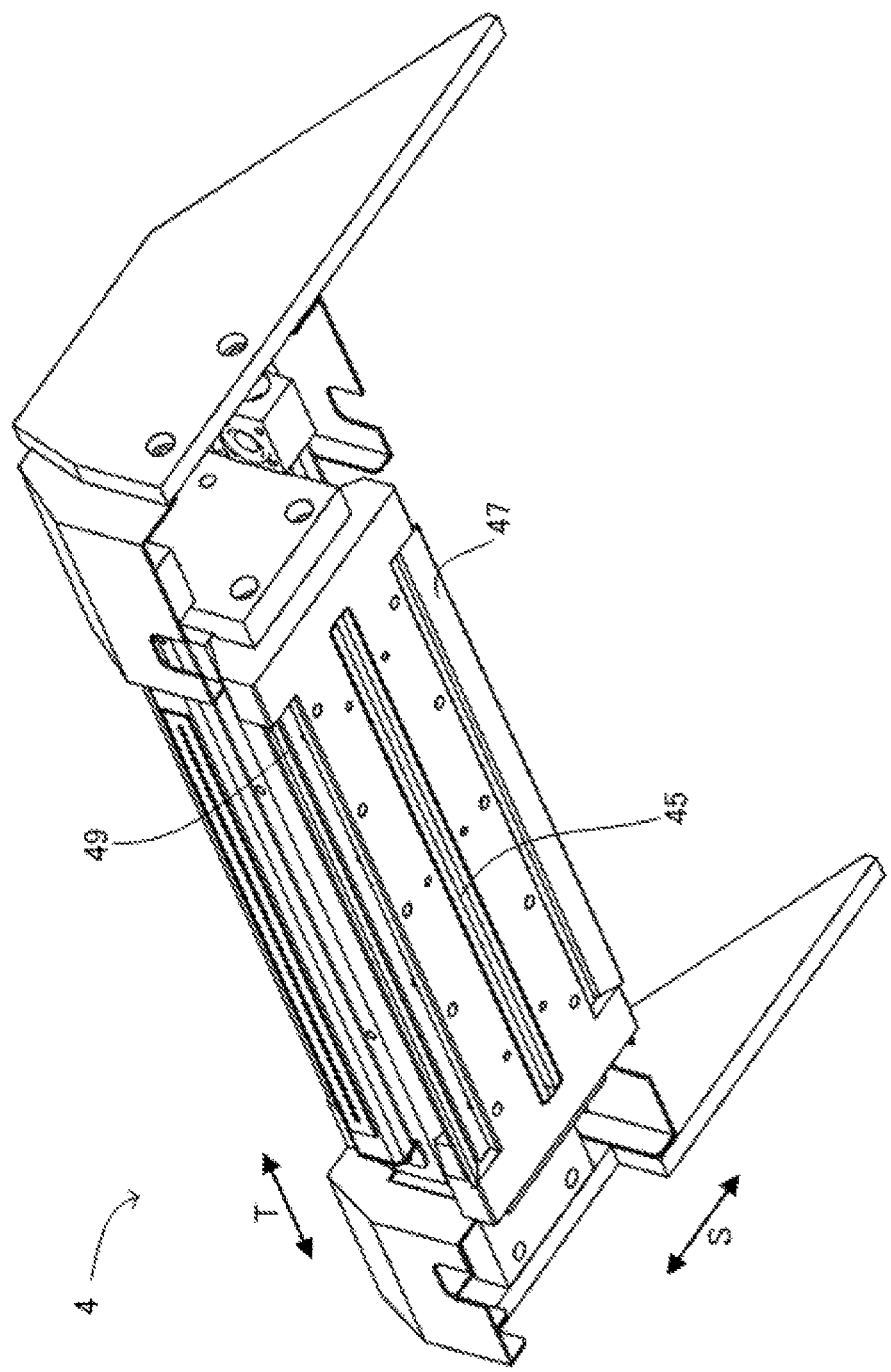
FIG. 4 is a perspective view of the recoater head 4 viewed from another angle.

As shown in FIGS. 3 and 4, the recoater head 4 includes a material storage portion 41 for storing the material powder, a material supply portion 43 disposed on an upper surface of the material storage portion 41 and serving as a receiving port of the material powder, and a material discharge portion 45 disposed on a bottom surface of the material storage portion 41 and discharging the material powder in the material storage portion 41. The material discharge portion 45 has a slit shape extending in a horizontal uniaxial direction (a direction indicated by arrows T) orthogonal to a movement direction (a direction indicated by arrows S) of the recoater head 4. The material powder is, for example, metal powder such as iron powder in a spherical shape having an average particle diameter of 20 μm. In addition, a pair of blades 47 and 49 are disposed on two side surfaces of the recoater head 4, respectively. The blades 47 and 49 planarize the material powder discharged from the material discharge portion 45 to form the material powder layer 63.

The cutting device 2 includes a processing head 21 and a processing head drive device 23. The processing head drive 23 includes a Y-axis drive device 232, an X-axis drive device 231 and a Z-axis drive device 233. The Y-axis drive device 232 drives the processing head 21 disposed in the molding compartment 11 to move along a Y-axis direction, the X-axis drive device 231 drives the Y-axis drive device 232 to move along an X-axis direction, and the Z-axis drive device 233 drives the processing head 21 to move along a Z-axis direction. The processing head 21 includes a spindle head 211. The spindle head 211 is configured so that a cutting tool 212 such as an end mill can be installed on the spindle head 211 and can rotate about an R axis. With this configuration, the processing head 21 can move the spindle head 211 to any position in the molding compartment 11 to perform cutting processing on the sintered layer, especially an end surface of the sintered layer. In the following, this cutting processing is referred to as end surface cutting. The cutting tool 212 may be used to perform cutting processing on the sintered layers every time a specific number of sintered layers are formed. Moreover, to smoothen the sintered layers or the molding plate 61, the upper surfaces of the sintered layers or the molding plate 61 may be cut. In the following, this cutting processing is referred to as upper surface cutting. For example, the upper surface cutting is used to remove protrusions when the recoater head 4 collides with the protrusions on the sintered layers.

A laser irradiation device 5 is disposed above the chamber 10. The laser beam L output from the laser irradiation device 5 is transmitted through a window 13 provided in the chamber 10, and is irradiated on a specific irradiation area β on the material powder layer 63 formed in the molding area α, thereby forming the sintered layer. The specific irradiation area β is included in the molding area α, and is approximately consistent with an area surrounded by the contour shape of the desired three-dimensional object. The laser irradiation device 5 can be constructed to scan the laser beam L two-dimensionally in the molding area α. For example, as shown in FIG. 2, the laser irradiation device 5 includes a laser beam source 51 for generating the laser beam L, a focus control unit 53 for focusing the laser beam L output by the laser beam source 51 and adjusting the laser beam L to a desired spot diameter, and a pair of galvanometer mirrors to scan the laser beam L two-dimensionally in the molding area α, that is, an X-axis galvanometer mirror 55 and a Y-axis galvanometer mirror 57. The X-axis galvanometer mirror 55 and the Y-axis galvanometer mirror 57 rotate with an A axis and a B axis as drive axes respectively, and the laser beam L is scanned along the X axis direction and the Y axis direction respectively (more precisely, XL axis direction and the YL axis direction). The type of the laser beam L is not limited herein, as long as it can sinter the material powder. For example, the laser beam L may be $CO_2$ laser, fiber laser, YAG laser. The window 13 is formed by a material that allows the laser beam L to transmit. For example, when the laser beam L is fiber laser or YAG laser, the window 13 may be made of quartz glass.

A fume diffusion device 15 covering the window 13 is disposed on the upper surface of the chamber 10. The fume diffusion device 15 includes a cylindrical casing 151 and a cylindrical diffusion member 152 disposed in the casing 151. An inactive gas supply space 153 is disposed between the casing 151 and the diffusion member 152. In addition, an opening 154 is arranged in the bottom surface of the casing 151 to the inner side of the diffusion member 152. A plurality of fine holes 155 is arranged in the diffusion member 152, so that clean inactive gas supplied from the inactive gas supply device to the inactive gas supply space 153 fills a clean compartment 156 through the fine holes 155. Then, the clean inactive gas filling the clean compartment 156 is sprayed out through the opening 154 towards under the diffusion device 15. The fume diffusion device 15 prevents the window 13 from being contaminated by the fume generated when the sintered layers are formed, and removes the fume that may traverse the irradiation path of the laser beam L towards side plates of the chamber 10.

Figure 5:
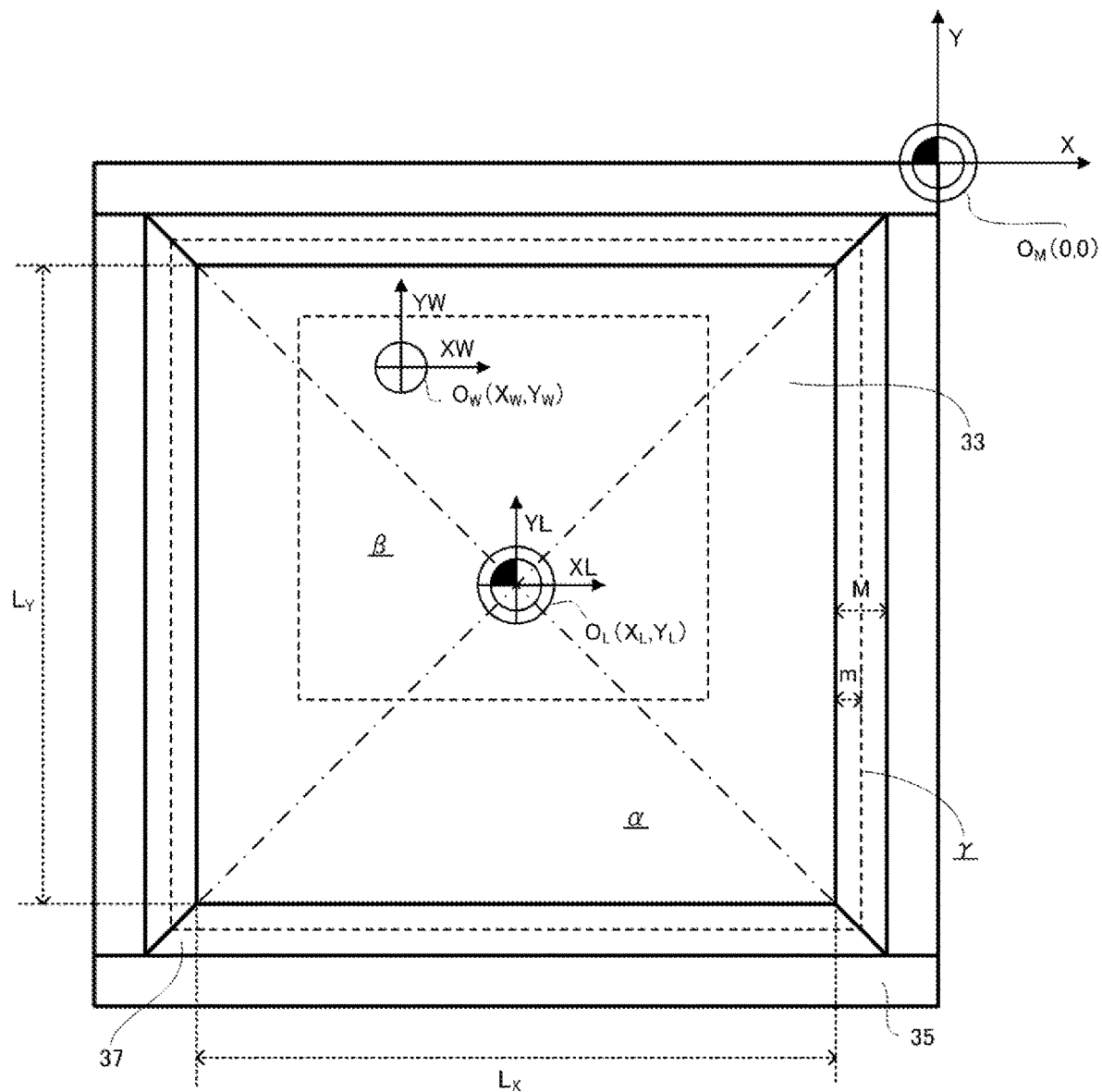
FIG. 5 is a top view of a molding table 33, a powder holding wall 35, and an upper wiper 37, and illustrates a coordinate system of the lamination molding apparatus 1.

Here, with reference to FIG. 5, a coordinate system of the lamination molding apparatus 1 according to this embodiment is described. The machine coordinate system is an inherent coordinate system of the lamination molding apparatus 1. The origin of the machine coordinate system is set to a machine origin $O_M$, and the coordinate value thereof is set to (0, 0). The planar coordinate axes of the machine coordinate system are set to an X axis and a Y axis separately. The work coordinate system is a reference coordinate system referring to cutting processing, in which the origin is set to a work origin $O_W$, and the coordinate axes are set to an $X_W$ axis and a $Y_W$ axis parallel to the X axis and the Y axis respectively. The work origin $O_W$ is set as a position moved from the machine origin $O_M$ by an X-axis work offset value $X_W$ and a Y-axis work offset value $Y_W$ along the X-axis direction and the Y-axis direction respectively, and the coordinate value of the work origin $O_W$ is set to $(X_W, Y_W)$. That is, the work offset values $X_W$, $Y_W$ are compensation values for the difference between the work origin $O_W$ and the machine origin $O_M$. The work origin $O_W$ is the origin to be used to determine a cutting position of the cutting tool 212. By inputting specific work offset values $X_W$, $Y_W$, a work coordinate system with any position as the work original $O_W$ may be defined, thereby implementing molding at a desired position. In other words, the coordinate axes $X_W$ and $Y_W$ in the work coordinate system may be substituted by the X axis and Y axis, so that the work coordinate system can be controlled as an XY coordinate system.

Moreover, the laser coordinate system is a reference coordinate system referring to irradiation of the laser beam, in which the origin is set to a laser origin $O_L$, and the coordinate axes are set to an XL axis and a YL axis parallel to the X axis and the Y axis respectively. The work coordinate system is associated with the laser coordinate system, and the laser coordinate system may also be controlled as an XY system having coordinate axes of the X axis and the Y axis. In addition, the molding area α is consistent in various coordinate systems. The laser origin $O_L$, which is the origin of the laser coordinate system, is at the center of the molding area α, and the coordinate value of the laser origin $O_L$ is set to $(X_L, Y_L)$.

As described above, in the laser coordinate system, in order to enable the scanning of the laser beam L to irradiate on a specific scanning path, it is necessary to measure the deviation amount and perform correction. Therefore, for example, a calibration plate is disposed on the molding table 33 before the molding starts, and is scanned with the laser beam L along a specific scan pattern such as a grating frame shape, and specific positions such as intersections of the scanning are measured to calculate the deviation amount and correct the deviation. Further, the work coordinate system must be associated with the laser coordinate system. Therefore, for example, a pair of imaging units (not shown) are arranged opposite to each other with the molding area α therebetween. Before or during the molding, the laser beam L is irradiated on a central position of the imaging units, so as to measure the deviation amount from the central position between the imaging units to the actual irradiation position and correct the deviation.

Here, the control axes of the lamination molding apparatus 1 are enumerated again. The control axis in the horizontal uniaxial direction of the processing head 21 is set to the X axis, the control axis in the horizontal uniaxial direction orthogonal to the X axis is set to the Y axis, the control axis in the vertical uniaxial direction is set to the Z axis, and the control axis in the rotation direction of the spindle head 211 is set to the R axis. In addition, the control axis in the horizontal uniaxial direction in which the recoater head 4 moves is set to the S axis. Moreover, the control axis in the vertical uniaxial direction in which the molding table 33 moves is set to the U axis. Further, the control axes of the pair of galvanometer mirrors 55, 57 are set to the A axis and the B axis respectively.

Figure 6:
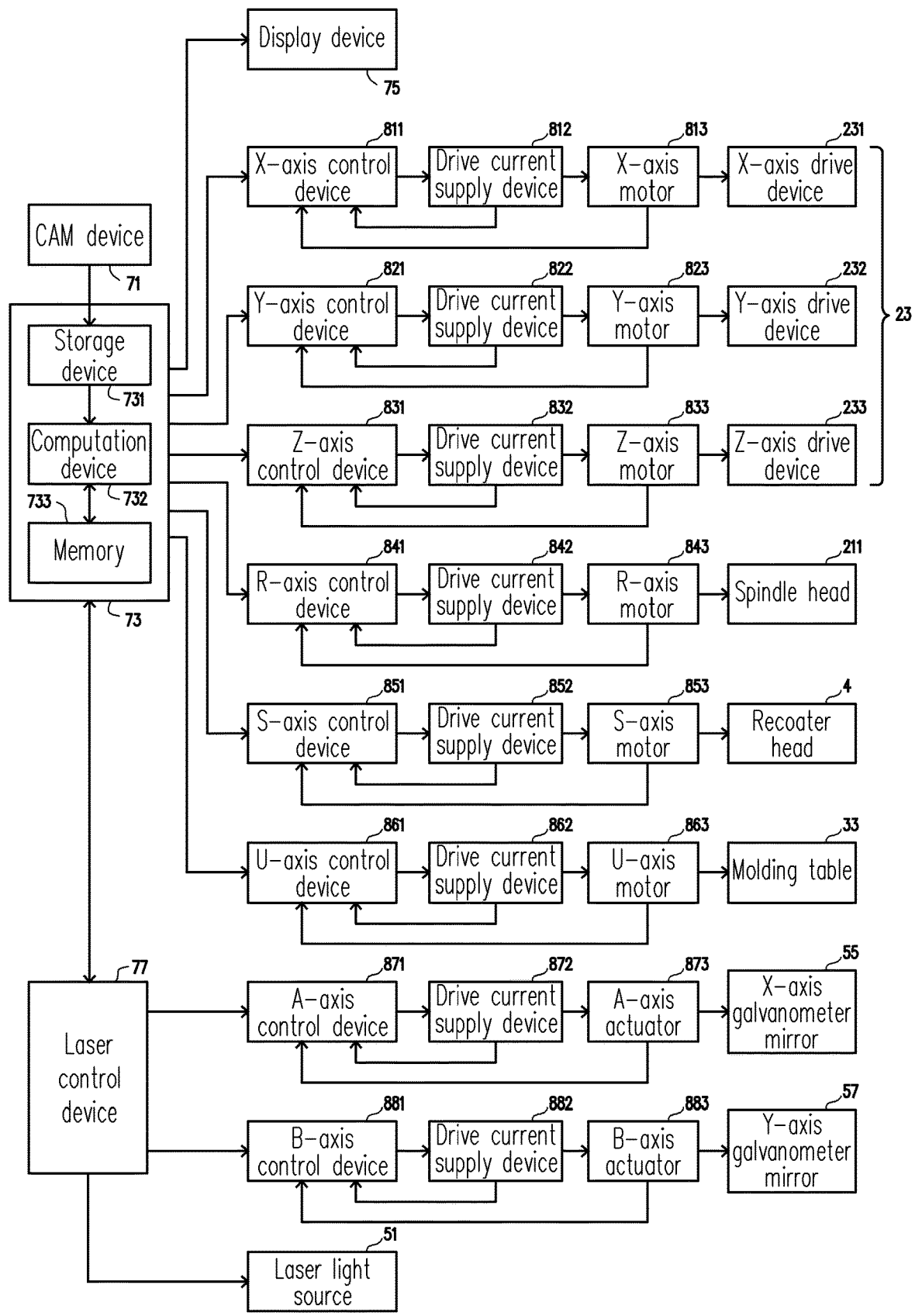
FIG. 6 is a block diagram of a control system of the lamination molding apparatus 1.

Next, with reference to FIG. 6, a control system of the lamination molding apparatus 1 according to this embodiment is described. A CAM device 71 generates project files for forming the desired three-dimensional object including a main program, a cutting program file, and a molding program file. The main program is composed by a plurality of program lines, each being allocated a sequence number. The program lines include a sintering instruction for each divided layer of a specific thickness of the desired three-dimensional object or a cutting instruction for cutting each sintered layer. Specific instructions related to the cutting path of the cutting tool 212 during end surface cutting or the scanning path of the laser beam L are included in the cutting program file or the molding program file. Basically, the cutting path during the end surface cutting included in the cutting program file is to outwardly add an offset of a radius r of the cutting tool 212 to the contour of the irradiation areas β in the divided layers corresponding to the sintered layers to be cut. However, as described in the following, the cutting path of the cutting tool 212 during the upper surface cutting is not included in the cutting program file, but is generated in each cutting by the numerical control device 73. Further, the cutting path refers to a movement track of the center of the cutting tool 212 during cutting. In addition, the CAM device 71 performs interference check of the cutting program file and the molding program file to prevent interference including between the molded object and the cutting tool.

The numerical control device 73 includes a storage device 731, a computation device 732, and a memory 733. The storage device 721 stores the project file sent by the CAM device 71 by means of a removable storage medium such as a flash memory or through a communications line. The computation device 732 executes various computations related to numerical control. For example, the computation device 732 analyzes the main program file and the cutting program file, and outputs instruction signals to control devices 811, 821, 831, 841, 851, and 861 of various axes, so that the control devices execute the main program according to the program lines. In addition, the computation device 732 determines whether the irradiation areas β in all the divided layers are included in the molding area α. The memory 733 temporarily stores the main program file and the cutting program file analyzed by the computation device 732. The data to be stored includes a maximum value $X_{MAX}$ of the X coordinate, a maximum value $Y_{MAX}$ of the Y coordinate, a minimum value $X_{MIN}$ of the X coordinate, and a minimum value $Y_{MIN}$ of the Y coordinate of the molded object. A display device 75 is connected to the numerical control device 73, and displays a work state of the lamination molding apparatus 1 or error messages on the screen based on data sent from the numerical control device 73.

Based on the analyzed main program file and cutting program file, the numerical control device 73 sends desired instruction signals to the control devices 811, 821, 831, 841, 851, and 861 of various axes. The control devices 811, 821, 831, 841, 851, and 861 of various axes send desired instruction signals to drive current supply devices 812, 822, 832, 842, 852, and 862. The drive current supply devices 812, 822, 832, 842, 852, and 862 send drive currents corresponding to the instruction signals to motors 813, 823, 833, 843, 853, and 863 of the axes respectively. In addition, the motors 813, 823, 833, 843, 853, and 863 are under feedback control.

A laser control device 77 is connected to the numerical control device 73, receives the molding program file from the numerical control device 73, and analyzes the molding program file to generate laser beam irradiation data. Based on the laser beam irradiation data, the laser control device 77 sends desired instruction signals to control devices 871 and 881 of various axes. The control devices 871 and 881 of various axes send desired instruction signals to drive current supply devices 872 and 882. The drive current supply devices 872 and 882 send drive currents corresponding to the instruction signals to actuators 873 and 883 of the galvanometer mirrors 55 and 57. The galvanometer mirrors 55 and 57 achieve desired rotation angles by means of the drive currents, thereby determining the irradiation position of the laser beam L on the molding table 33. Further, the laser control device 77 controls ON/OFF or intensity of the laser beam L emitted by the laser beam source 51. In addition, the actuators 873 and 883 are under feedback control.

Here, the method for determining whether the irradiation areas β of all divided layers are included in the molding area α is described in detail. The determining is performed at least before the forming of first sintered layer by using the laser beam L starts. In this embodiment, the determining is performed between the start of the molding, that is, the execution of the program file and the formation of the first material powder layer.

First, the computation device 732 finds a maximum value $αX_{MAX}$ of the X coordinate, a maximum value $αY_{MAX}$ of the Y coordinate, a minimum value $αX_{MIN}$ of the X coordinate, and a minimum value $αY_{MIN}$ of the Y coordinate of the molding area α. The stroke ranges of the laser beam L are set to $L_X$ and $L_Y$ for the X axis and the Y axis respectively on the numerical control device 73. In addition, as described above, the laser origin $O_L$ ($X_L$, $Y_L$) is located at the center of the molding area α. The above is expressed by the following formulas.

$$αX_{MAX} = X_L + \frac{L_X}{2}$$ [Formula 1]

$$αY_{MAX} = Y_L + \frac{L_Y}{2}$$ [Formula 2]

$$αX_{MIN} = X_L - \frac{L_X}{2}$$ [Formula 3]

$$αY_{MIN} = Y_L - \frac{L_Y}{2}$$ [Formula 4]

Next, the computation device 732 is used to find a maximum value $βX_{MAX}$ of the X coordinate, a maximum value $βY_{MAX}$ of the Y coordinate, a minimum value $βX_{MIN}$ of the X coordinate, and a minimum value $βY_{MIN}$ of the Y coordinate of the irradiation area β. The maximum value $X_{MAX}$ of the X coordinate, the maximum value $Y_{MAX}$ of the Y coordinate, the minimum value $X_{MIN}$ of the X coordinate, and the minimum value $Y_{MIN}$ of the Y coordinate of the molded object are already known, which may be obtained with reference to data stored in the memory 733. Besides, the work offset values of the X axis and the Y axis are $X_W$ and $Y_W$ respectively. The above is expressed by the following formulas.

$$βX_{MAX} = X_{MAX} + X_W$$ [Formula 5]

$$βY_{MAX} = Y_{MAX} + Y_W$$ [Formula 6]

$$βX_{MIN} = X_{MIN} + X_W$$ [Formula 7]

$$βY_{MIN} = Y_{MIN} + Y_W$$ [Formula 8]

At this time, when $$(αX_{MAX} \geq βX_{MAX})^\frown(αY_{MAX} \geq βY_{MAX})^\frown(αX_{MIN} \leq βX_{MIN})^\frown(αY_{MIN} \leq βY_{MIN})$$ [Formula 9]

is true, it can be determined that the irradiation areas β of all divided layers are included in the molding area α. In addition, because the cutting path during the end surface cutting is to outwardly add an offset of a radius r of the cutting tool 212 to the contour of the irradiation areas β in the divided layers, and the interference check is also performed in the CAM device 71, it can be determined that the scanning path during the end surface cutting is also appropriate. At this time, the numerical control device 73 instructs other parts to start molding.

If Formula 9 is false, it may be known that the irradiation area β of at least one divided layer exceeds the molding area α. At this time, before the sintered layer is formed, the numerical control device 73 sends an instruction for displaying an error message to the display device 75, reminding an operator of checking whether the project file is appropriate.

As described above, the numerical control device 73 determines, at least before the sintering, whether the irradiation areas β of all divided layers are included in the molding area α. The process includes: finding coordinate values of four points including the maximum value $αX_{MAX}$ and the minimum value $αX_{MAX}$ of the X axis and the maximum value $αY_{MAX}$ and the minimum value $αY_{MIN}$ of the Y axis of the molding area α, finding coordinate values of four points including the maximum value $βX_{MAX}$ and the minimum value $βX_{MIN}$ of the X axis and the maximum value $βY_{MAX}$ and the minimum value $βY_{MIN}$ of the Y axis of the irradiation area β, and comparing the maximum value $αX_{MAX}$ of the X axis of the molding area α with the maximum value $βX_{MAX}$ of the X axis of the irradiation area β, the minimum value $αX_{MIN}$ of the X axis of the molding area α with the minimum value $\beta X_{MIN}$ of the X axis of the irradiation area β, the maximum value $\alpha Y_{MAX}$ of the Y axis of the molding area α with the maximum value $\beta Y_{MAX}$ of the Y axis of the irradiation area β, and the minimum value $\alpha Y_{MIN}$ of the Y axis of the molding area α with the minimum value $\beta Y_{MIN}$ of the Y axis of the irradiation area β. When the maximum value $\alpha X_{MAX}$ of the X axis of the molding area α is greater than or equal to the maximum value $\beta X_{MAX}$ of the X axis of the irradiation area β, the maximum value $\alpha Y_{MAX}$ of the Y axis of the molding area α is greater than or equal to the maximum value $\beta Y_{MAX}$ of the Y axis of the irradiation area β, the minimum value $\alpha X_{MIN}$ of the X axis of the molding area α is smaller than or equal to the minimum value $\beta X_{MIN}$ of the X axis of the irradiation area β, and the minimum value $\alpha Y_{MIN}$ of the Y axis of the molding area α is smaller than or equal to the minimum value $\beta Y_{MIN}$ of the Y axis of the irradiation area β, it is determined that the irradiation areas β of all divided layers are included in the molding area α. Therefore, not only the three-dimensional object can be formed in the molding area α properly, but also the coordinate values $\alpha X_{MAX}$, $\alpha X_{MIN}$, $\alpha Y_{MAX}$, $\alpha Y_{MIN}$, $\beta X_{MAX}$, $\beta X_{MIN}$, $\beta Y_{MAX}$, and $\beta Y_{MIN}$ can be obtained easily from numerical data of the cutting program file or molding program file which is an NC program. In this way, the inclusion status can be easily and rapidly determined.

Further, when the lamination molding apparatus 1 includes the cutting device 2 and performs the upper surface cutting, preferably, it is determined, at least before the cutting, whether the cutting area δ that is to be cut by the cutting tool 212 is located in a cuttable area γ whose largest range is an area surrounded by the powder holding wall 35. In this embodiment, the determining is performed right before the upper surface cutting.

Figure 7:
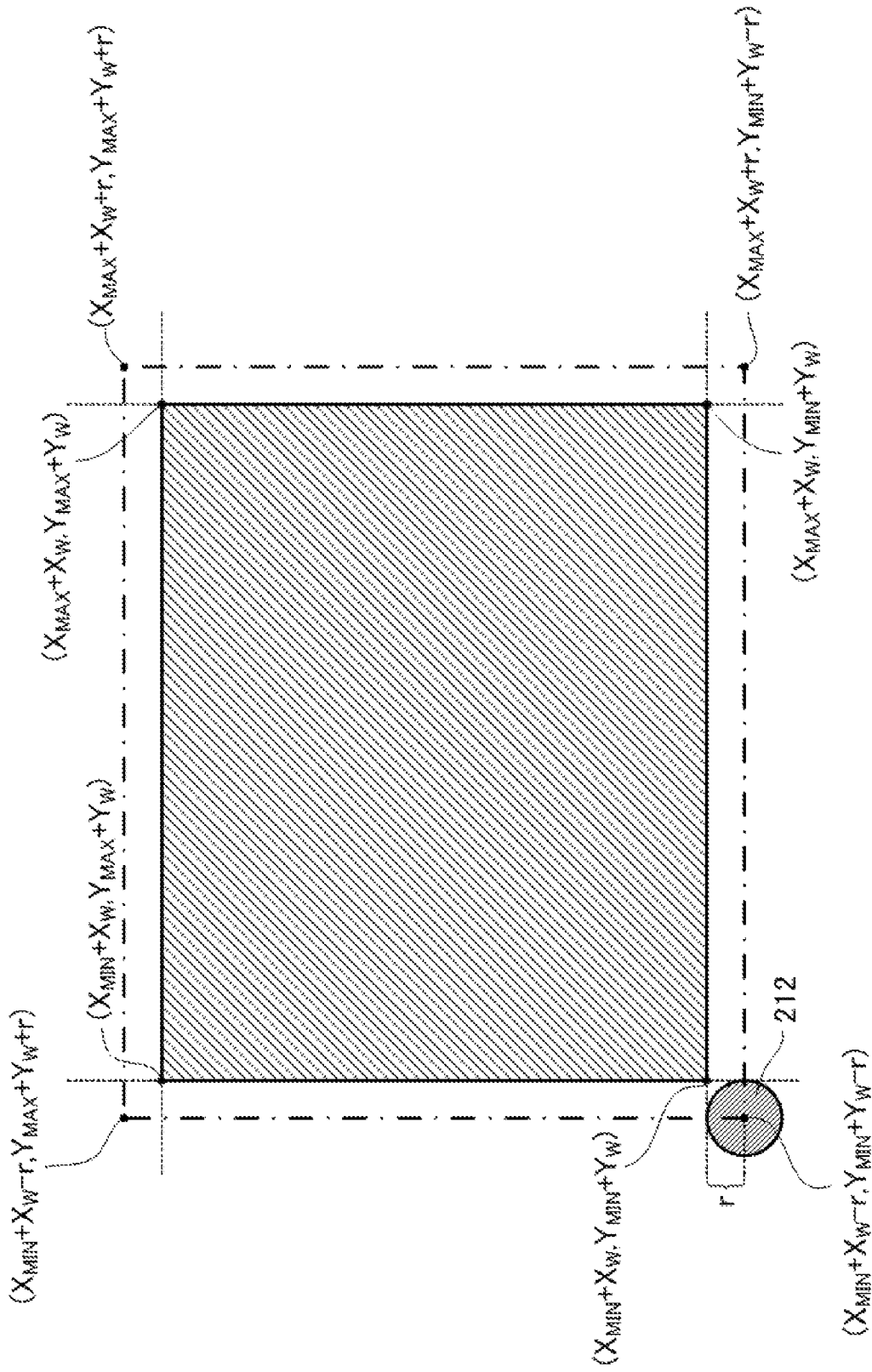
FIG. 7 is a diagram illustrating an example of a method for generating a cutting path when a cutting tool 212 cuts an upper surface.

Here, the method for generating a cutting path of the upper surface cutting is described. The cutting path of the upper surface cutting is set in a manner of covering at least the entire upper surface of the sintered layer or the molding plate 61 to be cut, which, for example, is obtained as follows. As shown in FIG. 7, first, the computation device 732 obtains a rectangular area having vertices of ($X_{MAX}+X_W$, $Y_{MAX}+Y_W$), ($X_{MAX}+X_W$, $Y_{MIN}+Y_W$), ($X_{MIN}+X_W$, $Y_{MAX}+Y_W$) and ($X_{MIN}+X_W$, $W_{MIN}+Y_W$) with reference to the maximum values and minimum values $X_{MAX}$, $Y_{MAX}$, $X_{MIN}$, and $Y_{MIN}$ of the X axis and Y axis of the molded object (or the molding plate 61 when the object to be cut is the molding plate 61, instead of the molded object) and the work offset values $X_W$ and $Y_W$. The maximum values and minimum values $X_{MAX}$, $Y_{MAX}$, $X_{MIN}$, and $Y_{MIN}$ and the work offset values $X_W$ and $Y_W$ are stored in the memory 733. Then, the computation device 732 adds an offset of the radius r of the cutting tool 212 to the outer side of the rectangular area to obtain a reference area shown as a dashed line in FIG. 7.

Figure 8:
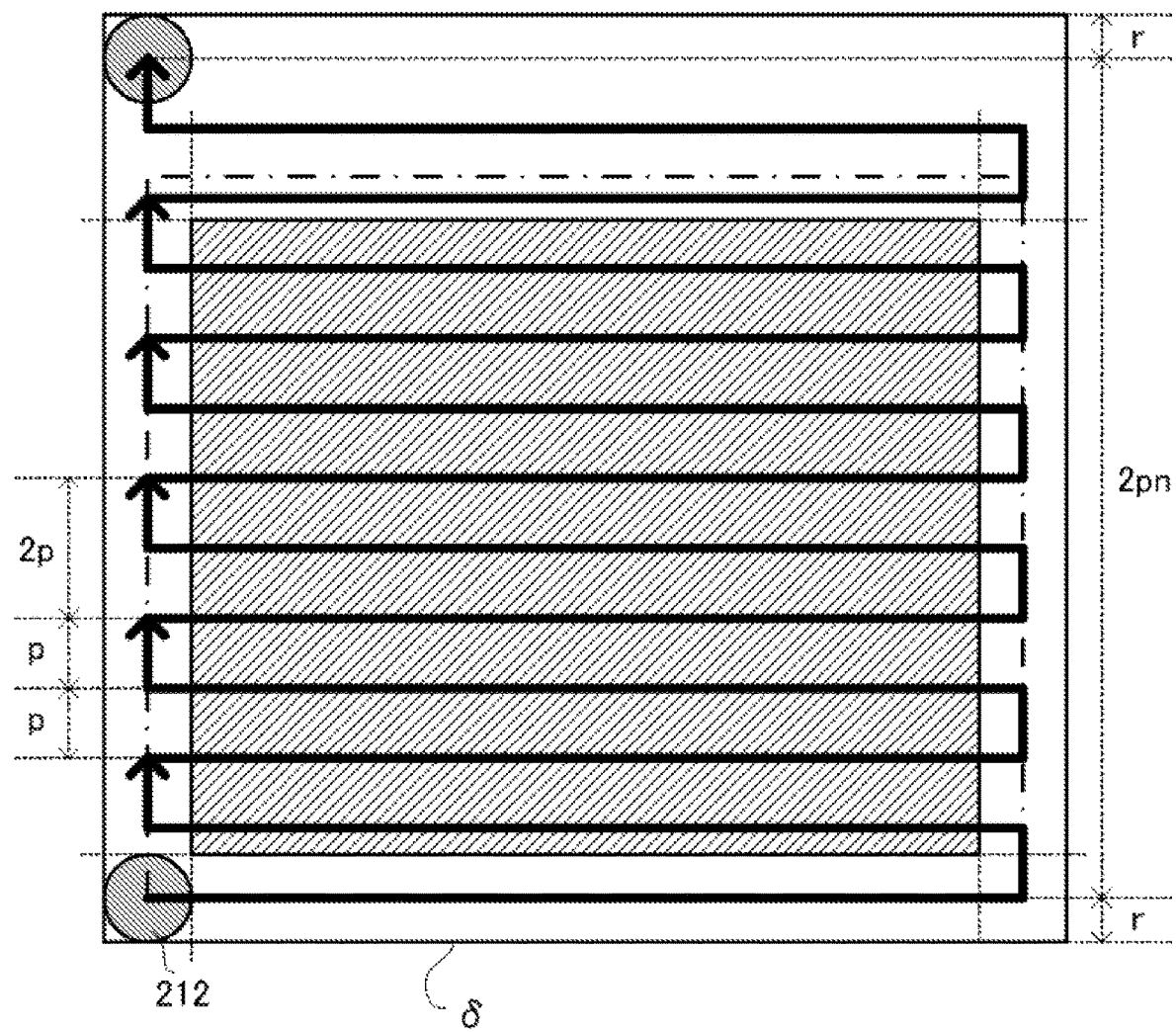
FIG. 8 is a diagram illustrating the example of the method for generating the cutting path when the cutting tool 212 cuts the upper surface.

As shown in FIG. 8, the cutting path is a moving path of the cutting tool 212 when reciprocating movement indicated by the arrows with one vertex of the reference area as a starting point is performed n times so as to cover the reference area. In this embodiment, one reciprocating movement consists of a movement from an edge of the reference area to the opposite edge of the reference area in the +X direction, a movement of a pitch width p in the +Y direction, a movement from an edge of the reference area to the opposite edge of the reference area in the −X direction, and a movement of a pitch width p in the +Y direction. Moreover, a pitch width p is a specific value satisfying 0<p≤φ, and φ is the diameter of the cutting tool 212. Here, n is the smallest natural number satisfying.

$$n \geq \frac{(Y_{MAX} + Y_w + r) - (Y_{MIN} + Y_W - r)}{2p} \quad \text{[Formula 10]}$$
$$\Leftrightarrow n \geq \frac{Y_{MAX} - Y_{MIN} + \varphi}{2p}$$

At this time, as shown in FIG. 8, an area formed by outwardly adding an offset of the radius r of the cutting tool 212 to the outer side of the smallest rectangular area including the cutting path is the cutting area δ.

In addition, when the project file is not executed, upper surface cutting can be performed separately. For example, upper surface cutting on the molding plate 61 is performed before the molding. At this time, before the upper surface cutting, the maximum values and minimum values $X_{MAX}$, $Y_{MAX}$, $X_{MIN}$, and $Y_{MIN}$ of the X axis and Y axis and the work offset values $X_W$ and $Y_W$ must be input manually in advance.

Next, the method for determining whether the cutting area δ is located in the cuttable area γ is described. First, the computation device 732 is used to find a maximum value $\gamma X_{MAX}$ of the X coordinate, a maximum value $\gamma Y_{MAX}$ of the Y coordinate, a minimum value $\gamma X_{MIN}$ of the X coordinate, and a minimum value $\gamma Y_{MIN}$ of the Y coordinate of the cuttable area γ. The largest range of the cuttable area γ is an area surrounded by the powder holding wall 35. However, for the purpose of safety, the cuttable area γ may also be set to shrink inwardly by a specific width. In other words, an area obtained by adding an offset value equivalent to a safety width m to the outer side of the molding area α may serve as the cuttable area γ. Moreover, when the width of the upper wiper 37 is set to M, 0≤m≤M. The above is expressed as the following formulas.

$$\gamma X_{MAX} = \alpha X_{MAX} + m \quad \text{[Formula 11]}$$

$$\gamma Y_{MAX} = \alpha Y_{MAX} + m \quad \text{[Formula 12]}$$

$$\gamma X_{MIN} = \alpha X_{MIN} - m \quad \text{[Formula 13]}$$

$$\gamma Y_{MIN} = \alpha Y_{MIN} - m \quad \text{[Formula 14]}$$

Next, as described above, the computation device 732 is used to obtain the cutting path of the upper surface cutting, and to find the maxim value $\delta X_{MAX}$ of the X coordinate, the maximum value $\delta Y_{MAX}$ of the Y coordinate, the minimum value $\delta X_{MIN}$ of the X coordinate, and the minimum value $\delta Y_{MIN}$ of the Y coordinate of the cutting area δ. As shown in FIG. 8, the above is expressed as the following formulas.

$$\delta X_{MAX} = X_{MAX} + X_W + \varphi \quad \text{[Formula 15]}$$

$$\delta X_{MIN} = X_{MIN} + X_W - \varphi \quad \text{[Formula 16]}$$

$$\delta Y_{MIN} = Y_{MIN} + Y_w - \varphi \quad \text{[Formula 17]}$$

$$\delta Y_{MAX} = \delta Y_{MIN} + r + 2pn + r \quad \text{[Formula 18]}$$
$$= Y_{MIN} + Y_w + 2pn$$

At this time, when $$(\gamma X_{MAX} \geq \delta X_{MAX})^{\wedge}(\gamma Y_{MAX} \geq \delta Y_{MAX})^{\wedge}(\gamma X_{MIN} \leq \delta X_{MIN})^{\wedge}(\gamma Y_{MIN} \leq \delta Y_{MIN}) \quad \text{[Formula 19]}$$

is true, it can be determined that the cutting area δ is included in the cuttable area γ. At this time, the numerical control device 73 instructs other parts to start the upper surface cutting.

If Formula 19 is false, it is known that the cutting area δ exceeds the cuttable area γ. At this time, before the upper surface cutting, the numerical control device 73 sends an instruction for displaying an error message to the display device 75, reminding an operator of checking whether the project file or setting is appropriate.

As described above, the numerical control device 73 determines, at least before the cutting, whether the cutting area δ is included in the cuttable area γ. The process includes: finding coordinate values of four points including the maximum value $\gamma X_{MAX}$ and the minimum value $\gamma X_{MIN}$ of the X axis and the maximum value $\gamma Y_{MAX}$ and the minimum value $\gamma Y_{MIN}$ of the Y axis of the cuttable area γ, finding coordinate values of the maximum value $\delta X_{MAX}$ and the minimum value $\delta X_{MIN}$ of the X axis and the maximum value $\delta Y_{MAX}$ and the minimum value $\delta Y_{MIN}$ of the Y axis of the cutting area δ, and comparing the maximum value $\gamma X_{MAX}$ of the X axis of the cuttable area γ with the maximum value $\delta X_{MAX}$ of the X axis of the cutting area δ, the minimum value $\gamma X_{MIN}$ of the X axis of the cuttable area γ with the minimum value $\delta X_{MIN}$ of the X axis of the cutting area δ, the maximum value $\gamma Y_{MAX}$ of the Y axis of the cuttable area γ with the maximum value $\delta Y_{MAX}$ of the Y axis of the cutting area δ, and the minimum value $\gamma Y_{MIN}$ of the Y axis of the cuttable area γ with the minimum value $\delta Y_{MIN}$ of the Y axis of the cutting area δ. When the maximum value $\gamma X_{MAX}$ of the X axis of the cuttable area γ is greater than or equal to the maximum value $\delta X_{MAX}$ of the X axis of the cutting area δ, the maximum value $\gamma Y_{MAX}$ of the Y axis of the cuttable area γ is greater than or equal to the maximum value $\delta Y_{MAX}$ of the Y axis of the cutting area δ, the minimum value $\gamma X_{MIN}$ of the X axis of the cuttable area γ is smaller than or equal to the minimum value $\delta X_{MIN}$ of the X axis of the cutting area δ, and the minimum value $\gamma Y_{MIN}$ of the Y axis of the cuttable area γ is smaller than or equal to the minimum value $\delta Y_{MIN}$ of the Y axis of the cutting area δ, it is determined that the cutting area δ is included in the cuttable area γ. Therefore, not only cutting can be performed in the cuttable area γ properly, but also the coordinate values $\gamma X_{MAX}$, $\gamma X_{MIN}$, $\gamma Y_{MAX}$, $\gamma Y_{MIN}$, $\delta X_{MAX}$, $\delta X_{MIN}$, $\delta Y_{MAX}$, and $\delta Y_{MIN}$ can be obtained easily from numerical data of the cutting program file or molding program file which is an NC program. In this way, the inclusion status can be easily and rapidly determined.

In this embodiment, the position of the cutting area δ is determined right before the upper surface cutting, which, however, may also be determined at other timing. For example, the position of the cutting area δ related to the upper surface cutting included in the program file is determined at the same time as the position of the irradiation area β is determined; or the position of the cutting area δ related to the upper surface cutting which is performed separately when the program file is not executed is determined separately right before the upper surface cutting. However, it is more appropriate to determine the position of the cutting area δ right before the upper surface cutting is to be performed, because this can adapt to the situation when the cutting path is changed during the execution of the program file.

The present invention is not limited to the configurations in the embodiments illustrated by the drawings as the examples described herein, but can have various modifications or applications without departing from the scope of the technical concept of the present invention.

What is claimed is:

1. A lamination molding method, wherein the lamination molding method is applied to a lamination molding apparatus, the lamination molding apparatus comprising:
    a chamber, covering at least a molding area which is the maximum range in which a three-dimensional object can be produced;
    a molding table, disposed in the molding area in the chamber, on which material powder layers are formed by uniformly spread material powder for each of a plurality of divided layers, wherein the divided layers are obtained by dividing a desired three-dimensional object for each of a specific thickness;
    a powder holding wall, surrounding the molding table and holding the material powder supplied onto the molding table;
    a laser irradiation device, forming sintered layers by irradiating laser beam on specific irradiation areas defined by the contour shape of the divided layers on the material powder layers; and
    a numerical control device,
    the lamination molding method comprising:
    determining, at least before sintering, whether the irradiation areas of all the divided layers are included in the molding area by the numerical control device by:
    finding coordinate values of four points in a laser coordinate system of the laser irradiation device, wherein a center of the molding area is an origin of the laser coordinate system, and the four points are a maximum value and a minimum value of an X axis of a control axis in a horizontal uniaxial direction of the molding area and a maximum value and a minimum value of a Y axis of the control axis in a horizontal uniaxial direction that is orthogonal to the X axis;
    finding coordinate values of four points of the irradiation area, wherein the four points are a maximum value and a minimum value of the X axis and a maximum value and a minimum value of the Y axis;
    comparing the maximum value of the X axis of the molding area with the maximum value of the X axis of the irradiation area, the minimum value of the X axis of the molding area with the minimum value of the X axis of the irradiation area, the maximum value of the Y axis of the molding area with the maximum value of the Y axis of the irradiation area, and the minimum value of the Y axis of the molding area with the minimum value of the Y axis of the irradiation area; and
    determining that the irradiation area of all the divided layers is included in the molding area when the maximum value of the X axis of the molding area is greater than or equal to the maximum value of the X axis of the irradiation area, the maximum value of the Y axis of the molding area is greater than or equal to the maximum value of the Y axis of the irradiation area, the minimum value of the X axis of the molding area is smaller than or equal to the minimum value of the X axis of the irradiation area, and the minimum value of the Y axis of the molding area is smaller than or equal to the minimum value of the Y axis of the irradiation area.

2. The lamination molding method according to claim 1, wherein the lamination molding apparatus further comprises a cutting device, wherein the cutting device comprises a cutting tool capable of moving inside the chamber and cutting upper surfaces of the sintered layers or an upper surface of a molding plate disposed on the molding table, the lamination molding method further comprising:

determining, at least before the cutting, whether a cutting area to be cut by the cutting tool is included in a cuttable area whose largest range is an area surrounded by the powder holding wall by the numerical control device.

3. The lamination molding method according to claim 2, wherein the numerical control device determines, at least before the cutting, whether the cutting area is included in the cuttable area by:

finding coordinate values of four points of the cuttable area, wherein the four points are a maximum value and a minimum value of the X axis and a maximum value and a minimum value of the Y axis;

finding coordinate values of four points of the cutting area, wherein the four points are a maximum value and a minimum value of the X axis and a maximum value and a minimum value of the Y axis;

comparing the maximum value of the X axis of the cuttable area with the maximum value of the X axis of the cutting area, the minimum value of the X axis of the cuttable area with the minimum value of the X axis of the cutting area, the maximum value of the Y axis of the cuttable area with the maximum value of the Y axis of the cutting area, and the minimum value of the Y axis of the cuttable area with the minimum value of the Y axis of the cutting area; and determining that the cutting area is included in the cuttable area when the maximum value of the X axis of the cuttable area is greater than or equal to the maximum value of the X axis of the cutting area, the maximum value of the Y axis of the cuttable area is greater than or equal to the maximum value of the Y axis of the cutting area, the minimum value of the X axis of the cuttable area is smaller than or equal to the minimum value of the X axis of the cutting area, and the minimum value of the Y axis of the cuttable area is smaller than or equal to the minimum value of the Y axis of the cutting area.

\* \* \* \* \*